US012603686B2

(12) United States Patent
Sun et al.

(10) Patent No.: US 12,603,686 B2
(45) Date of Patent: Apr. 14, 2026

(54) CHANNEL STATE INFORMATION (CSI) REPORTING FOR NEW RADIO (NR) SIDE-LINKS

(71) Applicant: Apple Inc., Cupertino, CA (US)

(72) Inventors: Haitong Sun, Cupertino, CA (US); Wei Zeng, Saratoga, CA (US); Chunxuan Ye, San Diego, CA (US); Dawei Zhang, Saratoga, CA (US); Yushu Zhang, Beijing (CN); Zhibin Wu, Los Altos, CA (US); Hong He, San Jose, CA (US)

(73) Assignee: APPLE INC., Cupertino, CA (US)

( * ) Notice: Subject to any disclaimer, the term of this patent is extended or adjusted under 35 U.S.C. 154(b) by 461 days.

(21) Appl. No.: 18/125,798

(22) Filed: Mar. 24, 2023

(65) Prior Publication Data

US 2023/0353211 A1     Nov. 2, 2023

Related U.S. Application Data

(60) Provisional application No. 63/363,713, filed on Apr. 28, 2022.

(51) Int. Cl.
H04W 72/25      (2023.01)
H04B 7/06      (2006.01)
H04L 5/00      (2006.01)

(52) U.S. Cl.
CPC ......... H04B 7/0626 (2013.01); H04L 5/0057 (2013.01); H04W 72/25 (2023.01)

(58) Field of Classification Search
CPC ..... H04B 7/0626; H04L 5/0057; H04W 72/25
See application file for complete search history.

(56) References Cited

U.S. PATENT DOCUMENTS

| | | | | |
|---|---|---|---|---|
| 9,571,251 | B2 * | 2/2017 | Davydov | H04W 72/21 |
| 10,523,296 | B2 * | 12/2019 | Liu | H04B 7/0478 |
| 12,184,361 | B2 * | 12/2024 | Gao | H04B 7/0626 |
| 2021/0050888 | A1 * | 2/2021 | Manolakos | H04B 7/088 |

(Continued)

FOREIGN PATENT DOCUMENTS

| | | |
|---|---|---|
| EP | 3799490 A1 | 3/2021 |
| WO | WO 2021029728 A1 | 2/2021 |

OTHER PUBLICATIONS

International Search Report and Written Opinion directed to related International Application No. PCT/US2023/019280, mailed Jul. 14, 2023; 10 pages.

*Primary Examiner* — Fahmida S Chowdhury
(74) *Attorney, Agent, or Firm* — Sterne, Kessler, Goldstein & Fox P.L.L.C.

(57) ABSTRACT

Aspects are described for a user equipment (UE) comprising a transceiver configured to enable wireless communication with a base station and a second UE, and a processor communicatively coupled to the transceiver. The processor is configured to determine one or more channel state information (CSI) reporting elements out of a set of CSI reporting elements. The processor is further configured to generate a MAC control element (MAC-CE) message. The MAC-CE message comprises an indicator that indicates a second MAC-CE message and a CSI report. The CSI report comprises the one or more CSI reporting elements. The processor is further configured to transmit, using the transceiver, the MAC-CE message to the second UE via a side-link connection.

20 Claims, 9 Drawing Sheets

(56)         References Cited

U.S. PATENT DOCUMENTS

| | | | |
|---|---|---|---|
| 2021/0051681 A1* | 2/2021 | Manolakos | H04L 1/0031 |
| 2021/0067303 A1* | 3/2021 | Taherzadeh Boroujeni | H04W 76/14 |
| 2021/0083820 A1* | 3/2021 | Gulati | H04L 1/0057 |
| 2021/0143882 A1* | 5/2021 | Sarkis | H04W 72/02 |
| 2021/0391907 A1* | 12/2021 | Wang | H04B 17/336 |
| 2022/0014955 A1* | 1/2022 | Yang | H04W 72/21 |
| 2022/0053420 A1* | 2/2022 | Xue | H04W 52/0216 |
| 2023/0032174 A1* | 2/2023 | Li | H04W 72/02 |
| 2023/0056484 A1* | 2/2023 | Hosseini | H04B 7/063 |
| 2023/0070567 A1* | 3/2023 | Wang | H04W 72/20 |
| 2023/0084636 A1* | 3/2023 | Hosseini | H04L 5/0048 370/329 |
| 2023/0114450 A1* | 4/2023 | Xue | H04L 5/0091 370/329 |
| 2023/0125285 A1* | 4/2023 | Elshafie | H04W 72/02 370/329 |
| 2023/0198717 A1* | 6/2023 | Elshafie | H04L 5/0091 370/329 |
| 2023/0353211 A1* | 11/2023 | Sun | H04W 24/10 |
| 2023/0361832 A1* | 11/2023 | Hao | H04B 7/0626 |
| 2023/0361955 A1* | 11/2023 | Ganesan | H04L 5/0048 |
| 2024/0031100 A1* | 1/2024 | Hao | H04L 5/0053 |
| 2024/0031109 A1* | 1/2024 | Hao | H04L 5/0048 |
| 2024/0381320 A1* | 11/2024 | Wu | H04W 72/56 |
| 2025/0015858 A1* | 1/2025 | Li | H04B 7/06958 |
| 2025/0142451 A1* | 5/2025 | Yang | H04W 48/08 |

* cited by examiner

300

302
Determine that a CSI reporting condition is met

304
Generate the CSI report

306
Transmit the CSI report

600

602
Determine a pair of CSI reporting elements

604
Generate a MAC CE message

606
Transmit the MAC CE message

800

802

Generate a configuration message

804

Transmit the configuration message

900

CHANNEL STATE INFORMATION (CSI) REPORTING FOR NEW RADIO (NR) SIDE-LINKS

CROSS REFERENCES

This application claims the benefit of U.S. Provisional Application No. 63/363,713 filed Apr. 28, 2022, titled "CHANNEL STATE INFORMATION (CSI) REPORTING FOR NEW RADIO (NR) SIDE-LINKS," the content of which is herein incorporated by reference in its entirety.

BACKGROUND

Field

The described aspects generally relate to channel state information (CSI) reporting for new radio (NR) side-links.

SUMMARY

Some aspects of this disclosure relate to systems, apparatuses, and methods for implementing a channel state information (CSI) reporting enhancement for new radio (NR) side-links. For example, the systems, the apparatuses, and the methods are provided for implementing a report quantity enhancement and a report mechanism enhancement for a CSI reporting process.

Some aspects of this disclosure relate to a user equipment (UE) comprising a transceiver configured to enable wireless communication with a base station and a second UE, and a processor communicatively coupled to the transceiver. The processor is configured to determine one or more channel state information (CSI) reporting elements out of a set of CSI reporting elements. The processor is further configured to generate a MAC control element (MAC-CE) message. The MAC-CE message comprises an indicator that indicates a second MAC-CE message and a CSI report. The CSI report comprises the one or more CSI reporting elements. The processor is further configured to transmit, using the transceiver, the MAC-CE message to the second UE via a side-link connection.

Some aspects of this disclosure relate to a UE comprising a transceiver configured to enable wireless communication with a base station and a second UE, and a processor communicatively coupled to the transceiver. The processor is configured to generate a side-link control information (SCI) message. The SCI message is configured to trigger the second UE to generate a MAC-CE message. The MAC-CE message comprises an indicator that indicates a second MAC-CE message and a CSI report. The CSI report comprises one or more CSI reporting elements out of a set of CSI reporting elements. The processor is further configured to transmit, using the transceiver, the SCI message to the second UE via a side-link connection and receive, using the transceiver, the MAC-CE message from the second UE via the side-link connection.

Some aspects of this disclosure relate to a base station comprising a transceiver configured to enable wireless communication with a UE and a processor communicatively coupled to the transceiver. The processor is configured to generate a configuration message. The configuration message is configured to cause the UE to generate a MAC-CE message. The MAC-CE message comprises an indicator that indicates a second MAC-CE message and a CSI report. The CSI report comprises one or more CSI reporting elements out of a set of CSI reporting elements. The processor is further configured to transmit, using the transceiver, the configuration message to the UE via a higher layer signaling.

This Summary is provided merely for the purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
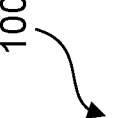
FIG. 1 illustrates an example system implementing a channel state information (CSI) reporting enhancement for new radio (NR) side-links, according to some aspects of the disclosure.
Figure 1:
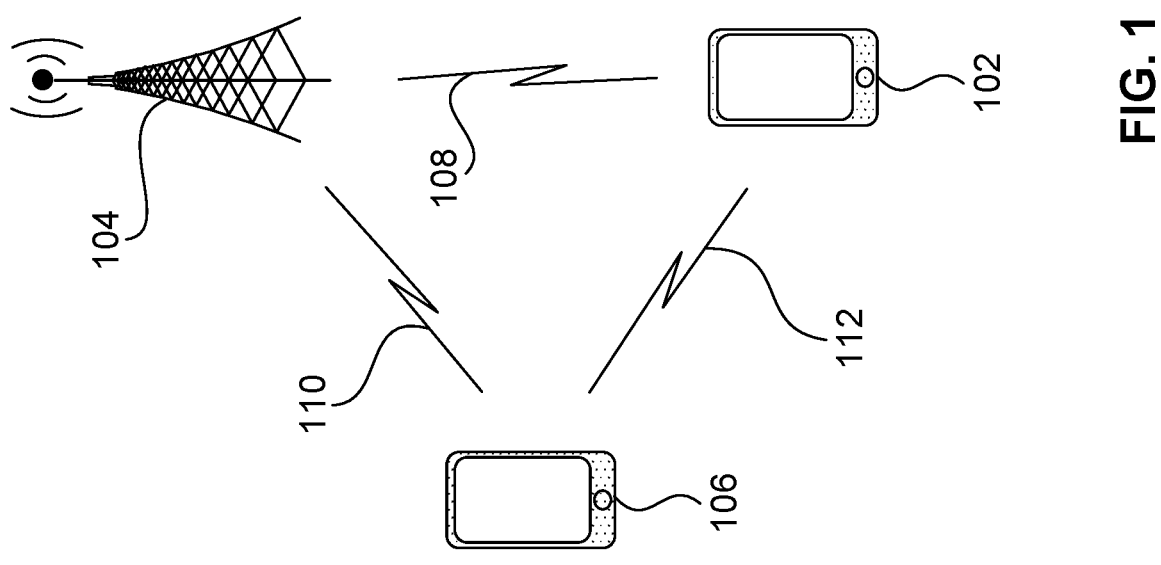

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a channel state information (CSI) reporting enhancement for new radio (NR) side-links. For example, the systems, the apparatuses, and the methods are provided for implementing a report quantity enhancement and a report mechanism enhancement for a CSI reporting process.

In some aspects, a user equipment (UE) reports various information to a base station by transmitting a CSI report to the base station. The information can include, but not limited to, channel conditions between the UE and the base station, preferences of the UE, and capabilities of the UE. For example, the base station can transmit channel state information reference signals (CSI-RSs) to the UE. The UE then evaluates radio channels between the UE and the base station, and reports the channel conditions to the base station via the CSI report. In some aspects, a CSI report can be used between UEs. For example, the UE can transmit CSI-RSs to a second UE via a side-link connection. The second UE can evaluate channel conditions of the side-link connection and report channel conditions by transmitting a side-link CSI report to the UE via the side-link connection.

In some aspects, the side-link CSI report includes various types of information or various quantities of information. For example, the side-link CSI report can include a channel state information reference signal indicator (CRI), a synchronization signal block resource index (SSBRI), layer 1 reference signal received power (L1-RSRP), layer 1 signal to interference and noise ratio (L1-SINR), a precoder matrix indicator (PMI), a layer indicator (LI), a coherent transmission indicator, and a combination thereof. The coherent transmission indicator can also reported to either the base station and/or the second UE via a radio resource control (RRC) message during UE capability reporting. For example, the UE can transmit the coherent transmission indicator to the base station via a physical uplink shared channel (PUSCH). The UE can also transmit the coherent transmission indicator to the second UE via a physical side-link shared channel (PSSCH). Each type of the information can have a fixed bitwidth or a configurable bitwidth. For example, the bitwidth of the CRI can be hardcoded in the UE and the second UE. The bitwidth of the CRI can also be configured by the base station. The base station can transmit a configuration message to the UE and the second UE, wherein the configuration message indicates the bitwidth of the CRI. In some aspects, a type of information can correspond to multiple bitwidths.

In some aspects, the second UE can transmit the side-link CSI reporting in various channels, such as a MAC layer of a physical side-link shared channel (PSSCH), a physical layer of the PSSCH, or a physical side-link feedback channel (PSFCH). When transmitting in the MAC layer of the PSSCH, the second UE generates a MAC control element (MAC-CE) message that includes the side-link CSI report. When transmitting in the physical layer of the PSSCH, the side-link CSI report transmission may conflict or overlap with a data payload transmission. In such a case, the second UE can drop the side-link CSI report, drop the data payload transmission, or multiplex the side-link CSI report with the data payload. When transmitting in the PSFCH, the second UE checks whether the PSFCH supports a transmission of more than 2 bits. If the PSFCH supports more than 2 bits transmission, the second UE transmits the side-link CSI report in the PSFCH.

In some aspects, the side-link CSI report can be configured with various scheduling schemes, such as aperiodic transmissions, periodic transmissions, and semi-persistent transmissions. Regarding the aperiodic transmissions, the second UE transmits the side-link CSI report based on a triggering signal. The triggering signal can be a side-link control information (SCI) message. For example, the UE generates the SCI message and sends it to the second UE. The second UE then transmits the CSI report to the UE in response to receiving the SCI message. In some aspects, the SCI message may trigger multiple CSI reports. Regarding the periodic transmissions, the base station configures the second UE to transmit the CSI report periodically to the UE. For example, the base station can transmit the configuration message to the second UE indicating the periodical transmission and a period. Regarding the semi-persistent transmissions, the base station configures radio resources, such as time periods and frequency bands, of the CSI report of the second UE. For example, the radio resources can correspond to a PSSCH or a PSFCH. The second UE transmits the CSI report using the radio resources after receiving an activation signal from the UE or the base station. The activation signal can be an SCI message or a MAC-CE message.

FIG. 1 illustrates an example system 100 implementing a CSI reporting enhancement for NR side-links, according to some aspects of the disclosure. The example system 100 is provided for the purpose of illustration only and does not limit the disclosed aspects. The example system 100 may include, but is not limited to, a UE 102, a UE 106, and a base station 104. The UEs 102 and 106 may be implemented as electronic devices configured to operate based on a wide variety of wireless communication techniques. These techniques may include, but are not limited to, techniques based on 3rd Generation Partnership Project (3GPP) standards. For example, the UEs 102 and 106 be configured to operate using one or more 3GPP releases, such as Release 15 (Rel-15), Release 16 (Rel-16), Release 17 (Rel-17), or other 3GPP releases. The UEs 102 and 106 may include, but is not limited to, wireless communication devices, smartphones, laptops, desktops, tablets, personal assistants, monitors, televisions, wearable devices, Internet of Things (IoT) devices, vehicle communication devices, and the like. The base station 104 may include one or more nodes configured to operate based on a wide variety of wireless communication techniques such as, but not limited to, techniques based on the 3GPP standards. For example, the base station 104 may include nodes configured to operate using Rel-15, Rel-16, Rel-17, or other 3GPP releases. The base station 104 may include, but not limited to, NodeBs, eNodeBs, gNBs, new radio base stations (NR BSs), access points (APs), remote radio heads, relay stations, and others.

In some aspects, the UE 102 connects with the base station 104 via a communication link 108. The communication link 108 can include uplink (UL) connections and downlink (DL) connections. In some aspects, the UE 102 can evaluate radio channels of the communication link 108 based on a CSI-RS transmission. For example, the base station 104 transmits CSI-RSs to the UE 102 via the DL connections of the communication link 108. The UE 102 can evaluate the radio channels of the DL connections based on the received CSI-RSs. In addition, the UE 102 can report evaluation results of the DL connections to the base station 104. For example, the UE 102 can generate a CSI report and transmit it the base station 104. The CSI report can also include other information, such as capabilities and/or requests of the UE 102.

In some aspects, UEs can connect with each other via a base station. For example, the UE 106 can connect with the base station 104 via a communication link 110. Therefore, the UE 102 can connect with the UE 106 via the base station 104 indirectly. For example, the base station 104 can relay information transmitted from the UE 102 to the UE 106.

In some aspects, UEs can also connect with each other directly without a base station. For example, the UE 102 can connect with the UE 106 via a side-link 112. The UE 102 can transmit CSI-RSs to the UE 106 via the side-link 112 and the UE 106 can evaluate radio channels of the side-link 112 based on the received CSI-RSs. In addition, the UE 106 can transmit a side-link CSI report back to the UE 102, wherein the side-link CSI report can include evaluation results of the side-link 112 and/or other information.

In some aspects, the UE 106 can report various information to the UE 102 using the side-link CSI report. For example, the side-link CSI report can include a CRI, an SSBRI, an L1-RSRP, an L1-SINR, a PMI, an LI, a coherent transmission indicator, and a combination thereof. Each type of the information can have a fixed bitwidth or a configurable bitwidth. In some aspects, some types of the information may have multiple bitwidths. For example, the L1-RSRP can be an absolute L1-RSRP, which indicates a signal strength level of a strongest beam or a first evaluated beam with an absolute value. The absolute L1-RSRP can occupy 7 bits. The L1-RSRP can also be a differential L1-RSRP, which indicates a relative signal strength level compared with the absolute L1-RSRP. The differential L1-RSRP can occupy 4 bits. Similarly, the L1-SINR can also be an absolute L1-SINR or a differential L1-SINR with their respective bitwidths. In some aspects, some types of information can be used to determine other types of information. For example, if the UE 106 supports more than two antenna ports, the UE 106 can report its coherent transmission capability/preference using the coherent transmission indicator, which can be used to determine the PMI. Specifically, the coherent transmission indicator can indicate that the UE 106 can support coherent transmissions and thus can maintain phase coherency between different antenna ports. The coherent transmission indicator can also indicate that the UE cannot support coherent transmissions and thus cannot maintain phase coherency between different antenna ports. Finally, the coherent transmission indicator can indicate that the UE 106 can support partial coherent transmission. The coherent transmission indicator can be reported to either the base state and/or the UE via RRC messages. For example, the UE 106 can transmit a first RRC message including the coherent transmission indicator to the base station via a PUSCH. The UE can also transmit a second RRC message including the coherent transmission indicator to the UE 102 via a PSSCH.

In some aspects, the various information can be grouped by pairs in the side-link CSI report. For example, the pair can be a combination of the CRI and the L1-RSRP, a combination of the SSBRI and L1-RSRP, a combination of the SSBRI and the L1-SINR, and a combination of the CRI and the L1-SINR, or other combinations. The side-link CSI report can include one or more pairs. In some aspects, the pair can include one beam index and one beam quality value. For example, the beam index can be a CRI or a SSBRI and the beam quality value can be an L1-RSRP or an L1-SINR. In some aspects, the various information is grouped by pair based on a size of a message, such as a MAC CE message, used to transmit the information. The pairs can also be identified by corresponding pair identification numbers. In such a case, a base station, such as the base station 104, can cause the UE 106 to include one or more pairs in the side-link CSI report by including pair identification numbers in a configuration message and transmitting the configuration message to the UE 106.

In some aspects, the side-link 112 can include a plurality of channels. For example, the side-link 112 can include a PSSCH and a PSFCH. The UE 106 can transmit the side-link CSI report in either or both the PSSCH and the PSFCH. The base station 104 can configure the UE 106 regarding channels to be used for the side-link CSI report transmissions. For example, the base station 104 can transmit a configuration message to the UE 106 via a higher layer signaling. The configuration message can configure the UE 106 to transmit the side-link CSI report in the PSSCH, the PSFCH, or both. In some aspects, the UE 106 can transmit the side-link CSI report in different layers. For example, the UE 106 can transmit the side-link CSI report in a MAC layer of the PSSCH using a MAC CE message. The UE 106 can also transmit the side-link CSI report in a physical layer of the PSSCH using data payloads. The UE 106 can also transmit the side-link CSI report in a physical layer of the PSFCH using control payloads. Similar to the channels used for the side-link CSI report transmission, the base station 104 can configure a layer that the UE 106 uses for the side-link CSI report transmission.

In some aspects, the UE 106 can transmit the side-link CSI report using different scheduling schemes, such as aperiodic, periodic, and semi-persistent transmissions as discussed above. Again, the base station 104 can configure the UE 106 as which scheduling scheme to use for the side-link CSI report transmission.

Figure 2:
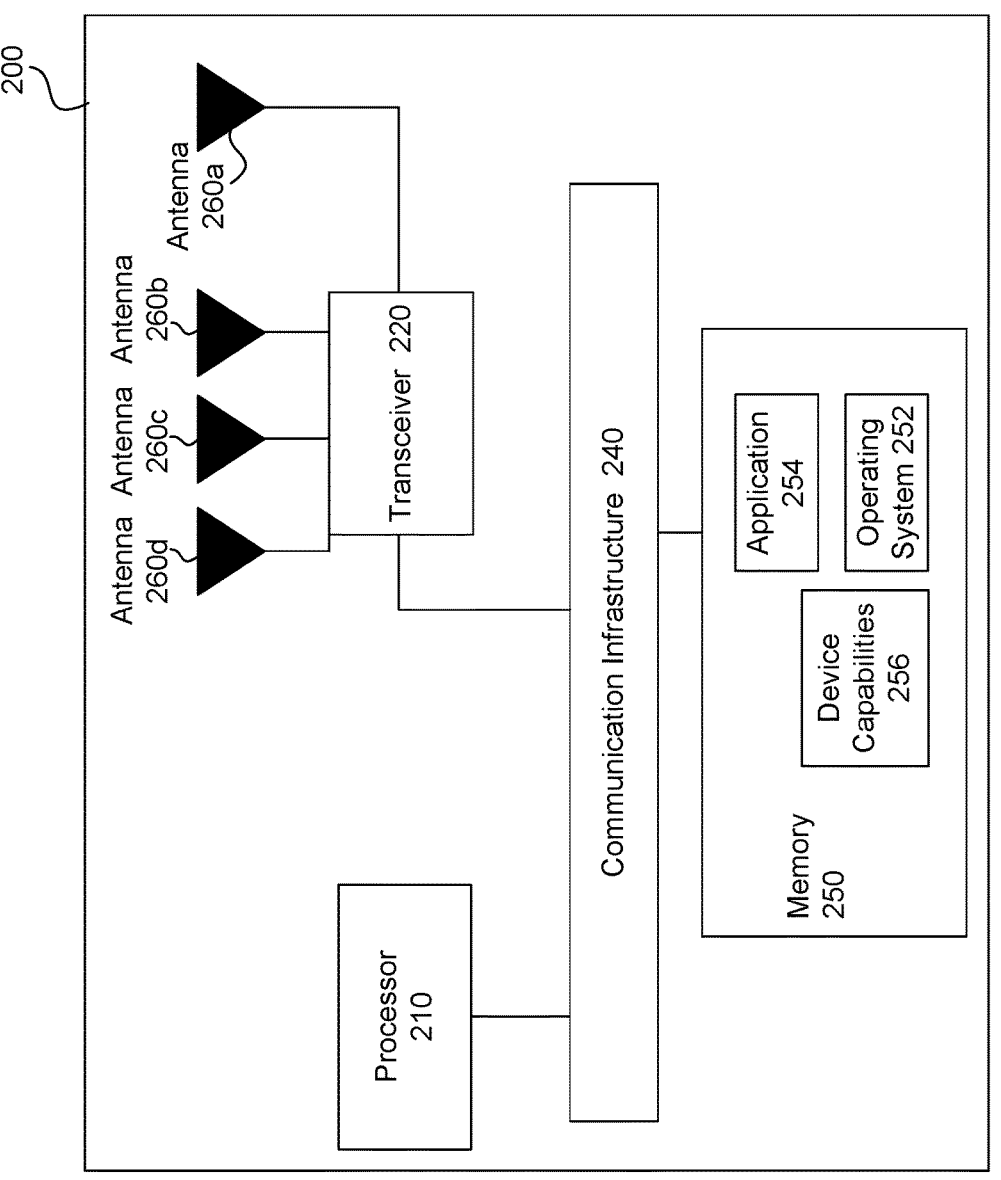
FIG. 2 illustrates a block diagram of an example system of an electronic device for the CSI reporting enhancement, according to some aspects of the disclosure.

FIG. 2 illustrates a block diagram of an electronic device 200 implementing the CSI report enhancement for the NR side-links, according to some aspects of the disclosure. The electronic device 200 may be any of the electronic devices (e.g., the UEs 102, 106, and the base station 104) of the system 100. The electronic device 200 includes a processor 210, one or more transceivers 220, a communication infrastructure 240, a memory 250, an operating system 252, an application 254, device capabilities 256, and antennas 260*a*, 260*b*, 260*c*, and 260*d*. Illustrated systems are provided as exemplary parts of electronic device 200, and electronic device 200 may include other circuit(s) and subsystem(s). Also, although the systems of electronic device 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The applications in the application 254 may include applications such as, but not limited to, radio streaming, video streaming, remote control, and/or other user applications. In some aspects, the device capabilities 256 may be stored in the memory 250.

The electronic device 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling electronic device 200 of the system 100 to implement mechanisms for the CSI reporting enhancement, as described herein. Alternatively, or additionally, the processor 210 can be "hard coded" to implement mechanisms for the CSI reporting enhancement, as described herein.

The one or more transceivers 220 transmit and receive communications signals support mechanisms for the CSI reporting enhancement. Additionally, the one or more transceivers 220 transmit and receive communications signals that support mechanisms for measuring communication link(s), generating and transmitting system information, and receiving the system information. According to some aspects, the one or more transceivers 220 may be coupled to the antennas 260a, 260b, 260c and 260d to wirelessly transmit and receive the communication signals. The antennas 260a, 260b, 260c and 260d may include one or more antennas that may be the same or different types and can form one or more antenna ports. The one or more transceivers 220 allow electronic device 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-9, processor 210 may implement different mechanisms for the CSI reporting enhancement as discussed with respect to the system 100 of FIG. 1.

Figure 3:
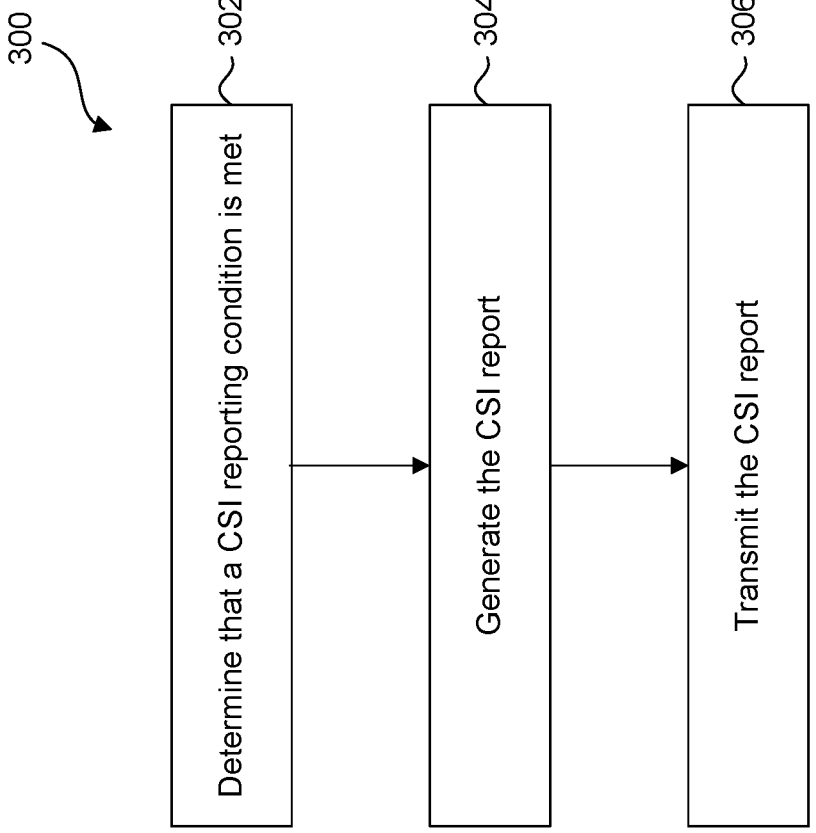
FIG. 3 illustrates an example method of the CSI reporting enhancement for NR side-links, according to aspects of the disclosure.

FIG. 3 illustrates an example method 300 of the CSI reporting enhancement for NR side-links. The example method 300 is provided for the purpose of illustration only and does not limit the disclosed aspects. As a convenience and not a limitation, FIG. 3 may be described with regard to elements of FIGS. 1, 2, and 9. The example method 300 may represent the operation of electronic devices (for example, the UEs 102, 106, and the base station 104 of FIG. 1) implementing the CSI reporting enhancement. The example method 300 may also be performed by the electronic device 200 of FIG. 2, controlled or implemented by processor 210, and/or computer system 900 of FIG. 9. But the example method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, the UE 106 determines whether a CSI reporting condition is met. The CSI reporting condition depends on a scheduling scheme of the UE 106. As discussed above, the scheduling scheme can be aperiodic transmissions, periodic transmissions, and semi-persistent transmissions. The scheduling scheme can be configured by a base station, such as the base station 104. For example, the base station 104 generates a configuration message and transmits it to the UE 106 directed via the communication link 110 or indirectly via the UE 102. The configuration message indicates which scheduling scheme the UE 106 should use, and the UE 106 determines whether the reporting condition is met based on the scheduling scheme provided by the base station 104.

At 304, the UE 106 generates a CSI report based on CSI measurements performed by the UE 106. For example, the UE 106 can receive CSI-RSs from the UE 102 via the side-link 112 and measure the radio channels of the side-link 112 based on the CSI-RSs. The CSI report can include various reporting elements regarding channel conditions of the side-link 112 based on the CSI measurements, beam indexes of the side-link 112, capabilities/preferences of the UE 106, and/or other information available to the UE 106. For example, the beam conditions of the side-link 112 can include L1-RSRP levels and L1-SINRs. The beam indexes of the side-link 112 can include CRIs and SSBRIs. The capabilities/preferences of the UE 106 can include PMIs, LIs, and coherent transmission indicators. The UE 106 determines the reporting elements to be included in the CSI report. In some aspects, the UE 106 makes the determination based on the configuration message received from the base station 104. In other aspects, the UE 106 can also make the determination independently without receiving the configuration message. For example, the UE 106 may determine that the evaluation of the side-link 112 channel conditions is complete and should be included in the CSI report. The UE 106 may also determine that the UE 102 is not aware of a coherent transmission capability of the UE 106 and include a coherent transmission indicator in the CSI report.

At 306, the UE 106 transmits the CSI report to another UE, such as the UE 102. The UE 106 can transmit the CSI report in different channels. For example, the UE 106 can transmit the CSI report in a PSFCH. The UE 106 first determines whether or not the PSFCH of the side-link 112 supports more than 2 bits transmission. If the PSFCH does not support more than 2 bits transmission, the UE 106 may determine to transmit the CSI report in other channels, such as a PSSCH. When transmitting in the PSSCH, the UE 106 can transmit the CSI report in a MAC layer and/or a physical layer of the PSSCH. In the MAC layer, the UE 106 generates a MAC-CE that includes the CSI report and transmits the MAC-CE to the UE 102 via the MAC layer of the PSSCH. In the physical layer, the CSI report shares the PSSCH with data payload transmission. Thus, the UE 106 considers resolutions when the CSI report conflicts with the data payload transmission. First, the UE 106 can drop the CSI report when the CSI report conflicts with the data payload transmission. Second, the UE 106 can drop the data payload transmission during the conflict. Third, the UE 106 can multiplex the CSI report with the data payload transmission during the conflict. For example, the UE 106 can perform a code multiplexing by encoding the CSI report and the data payload with orthogonal codes and combining the encoded CSI report and data payload. The UE 106 can also perform a time and/or frequency domain multiplexing by assigning different time slots and/or different frequency tones to the CSI report and the data payload. The UE 106 can also perform a spatial multiplexing by assigning different antenna ports to the CSI report and the data payload. In some aspects, the UE 106 performs the multiplexing when the CSI report and the data payload transmission are triggered by a same CSI.

In some aspects, the channels and layers used for the CSI report transmission are configured by a base station via a higher layer signaling. For example, the base station 104 can generate a configuration message that indicates the physical layer of the PSSCH. The configuration message can also configure the UE 106 to drop the data payload transmission when the CSI report conflicts with the data payload transmission. The base station 104 then transmits the configuration message to the UE 106 via the communication link 110.

Figure 4:
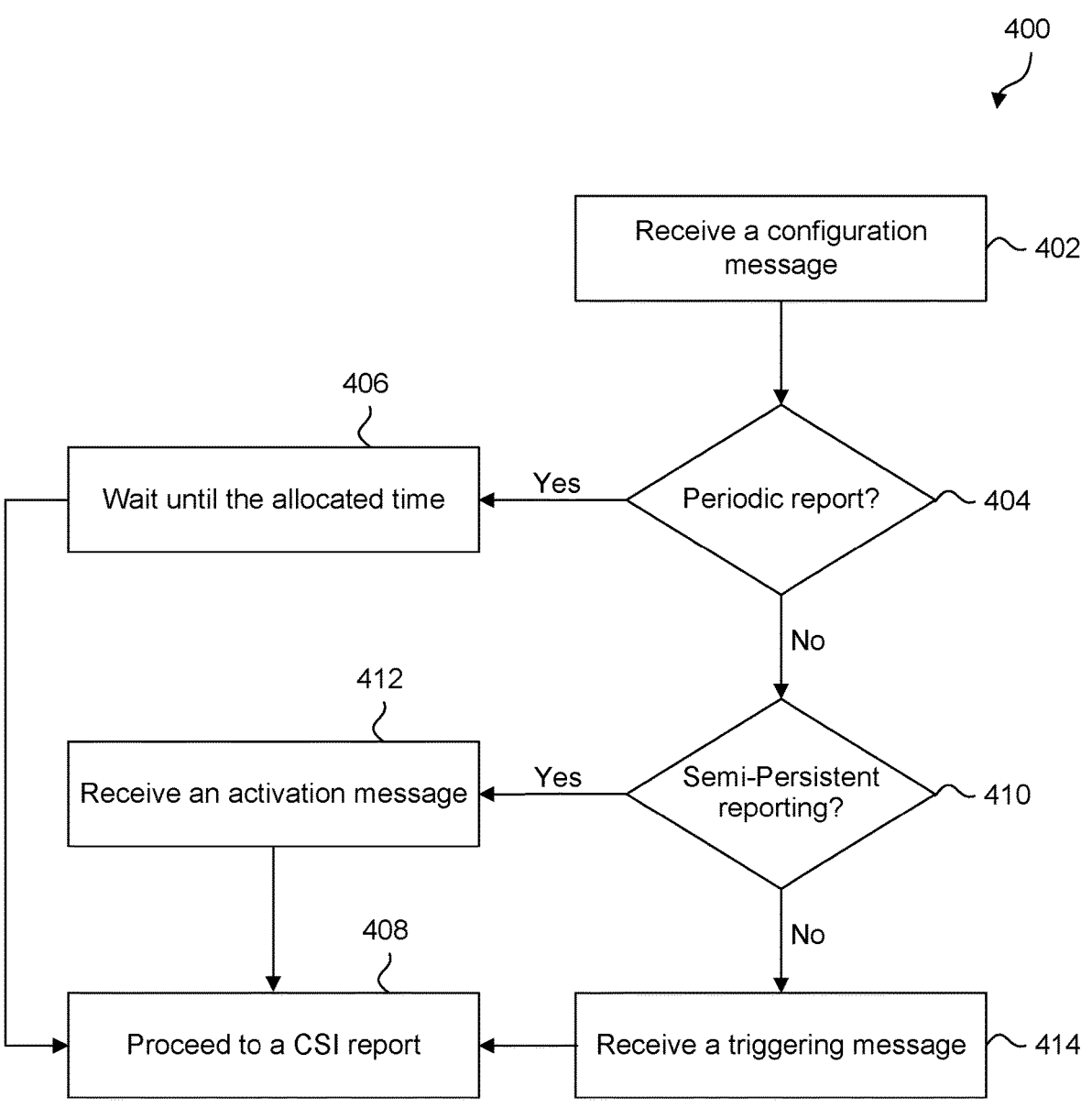
FIG. 4 illustrates an example method of the CSI reporting enhancement in scheduling for NR side-links, according to aspects of the disclosure.

FIG. 4 illustrates an example method 400 of the CSI reporting enhancement in scheduling for NR side-links. The example 400 provides detailed descriptions of step 302 of FIG. 3. The example method 400 is provided for the purpose of illustration only and does not limit the disclosed aspects. As a convenience and not a limitation, FIG. 4 may be described with regard to elements of FIGS. 1, 2, and 9. The example method 400 may represent the operation of electronic devices (for example, the UEs 102, 106, and the base station 104 of FIG. 1) implementing the CSI reporting enhancement. The example method 400 may also be performed by the electronic device 200 of FIG. 2, controlled or implemented by processor 210, and/or computer system 900 of FIG. 9. But the example method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the UE 106 receives a configuration message. The UE 106 can receive the configuration message from the base station 104 via the communication link 110. The UE 106 can also receive the configuration message from the UE 102 via the side-link 112, wherein the configuration message can be generated by the UE 102 or by the base station 104.

At 404, the UE 106 determines whether to transmit the CSI report periodically based on the configuration message. If the UE 106 determines to transmit the CSI report periodically, the UE 102 also determines a transmission period based on the configuration message, and the control moves to 406.

At 406, the UE 106 waits until an allocated time based on the transmission period.

At 408, the UE 106 proceeds to generate the CSI report. For example, the UE 106 generates the CSI report as described in 304 of FIG. 3 and transmits the CSI report as described in 306 of FIG. 3.

Referring back to 404, if the UE 106 determines not to transmit the CSI report periodically, the control moves to 410.

At 410, the UE 106 determines whether to transmit the CSI report semi-persistently. The UE 106 can determine to transmit the CSI report semi-persistently based on the configuration message. In some aspects, the configuration message can also include radio resources assigned to the CSI report transmission, such as assigned resource elements (REs) and/or channels. The control then moves to the 412.

At 412, the UE 106 receives an activation message for the CSI report transmission. In some aspects, the UE 106 can receive the activation message via a MAC-CE message from the UE 102 or the base station 104. In such a case, the UE 106 checks whether the PSFCH of the side-link 112 supports more than 2 bits transmissions. If yes, the UE 106 is configured to transmit the CSI report in the PSFCH. If the PSFCH cannot support more than 2 bits transmissions, the UE 106 is configured to transmit the CSI report in the PSSCH. In some aspects, the UE can also receive the activation message via an SCI message from the UE 102. In such a case, the UE 102 is configured to transmit the CSI report in the PSSCH. After receiving the activation message, the control moves to 408.

At 408, the UE proceeds to generate the CSI report. For example, the UE 106 generates the CSI report as described in 304 of FIG. 3. The UE 106 also transmits the CSI report as configured in 412.

In some aspects, the UE 106 can also receive a deactivation message via the MAC-CE message or the SCI message at 412 from the UE 102 or the base station 104. In such a case, the UE 102 is no longer configured to transmit the CSI report semi-persistently, and the control moves to 414 (not shown).

Referring back to 410, if the UE 106 determine not to transmit the CSI report semi-persistently, the UE 106 can transmit the CSI report aperiodically. In such a case, the control moves to 414.

At 414, the UE 106 receives a triggering message for the CSI reporting from the UE 102 or the base station 104. The UE 106 can receive the triggering message via the SCI message. For example, the UE 106 can receive the SCI message from the base station 104 via a downlink control information (DCI) message. In some aspects, the SCI message includes a CSI request field, which includes one or more bits. The one or more bits can correspond to one or more CSI reports. For example, a first bit of the one or more bits can correspond to a first CSI report that includes a CRI and a L1-RSRP level. A second bit of the one or more bits can correspond to a second CSI report that includes SSBRI and a L1-SINR level. In such a case, when the UE 106 receives the SCI message, it transmits both the first and the second CSI reports per the triggering message. In some aspects, the base station 104 configures the number of bits that are included in the CSI request field of the SCI message and corresponding CSI reports for the one or more bits. Once the UE 106 receives the triggering message, the control moves to 408 and the UE 106 generates the CSI report based on CSI measurements, and transmits the CSI report.

Figure 5:
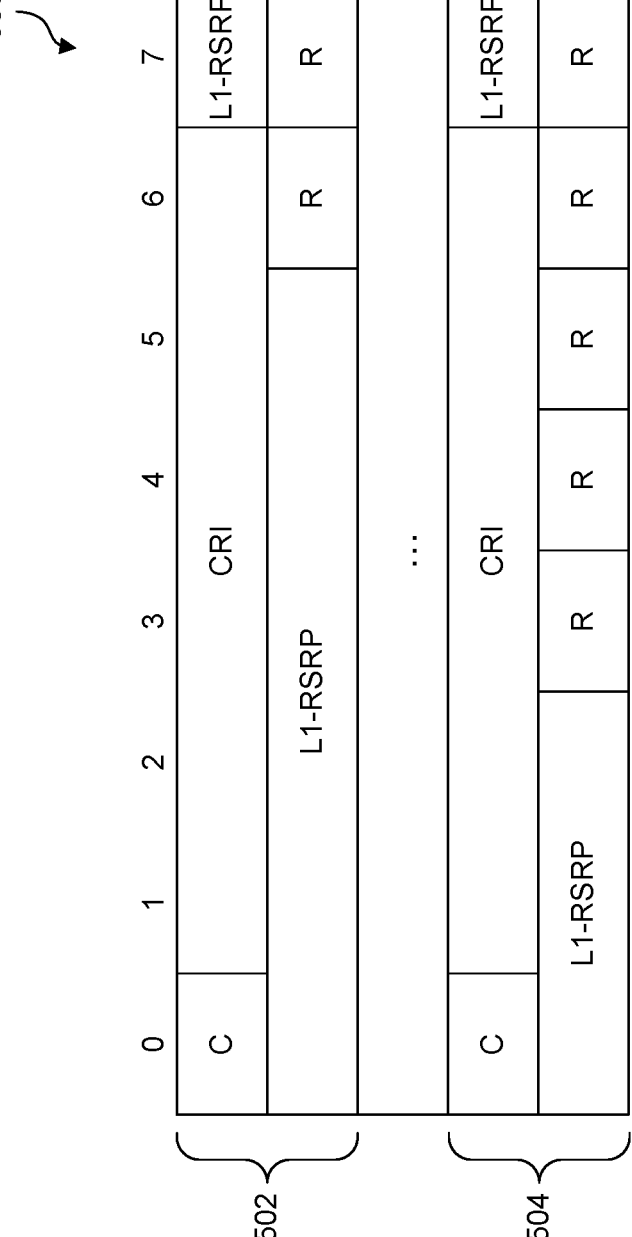
FIG. 5 illustrates an example of MAC control element (MAC-CE) messages of the CSI reporting enhancement, according to aspects of the disclosure.

FIG. 5 illustrates an example 500 of MAC CE messages of the CSI reporting enhancement. The example 500 is provided for the purpose of illustration only and does not limit the disclosed aspects. The example 500 includes a MAC CE message 502 and a MAC CE message 504. In some aspects, each MAC message includes one or more sets of eight bits. For example, the MAC CE messages 502 and 504 each includes two sets of eight bits, e.g., sixteen bits.

In some aspects, a MAC CE message can include a CSI report that includes a pair of reporting elements. For example, CSI reports included in the MAC CE messages 502 and 504 each includes a CRI and an L1-RSRP level. The CSI report can also include other pairs, such as a combination of a CRI and an L1-SINR or other combinations as described above in FIG. 1. The MAC-CE message can also include one or more reporting elements, not necessarily in pair.

In some aspects, MAC CE messages can be interconnected. For example, a MAC CE message can include a parameter C to indicate the connection. Here, a parameter C of the MAC CE message 502 is set to 1 and it indicates that a following MAC CE message is expected, such as the MAC CE message 504. A parameter C of the MAC CE message 504 is set to 0 if no following MAC message is expected after the MAC CE message 504.

In some aspects, the UE 106 transmits a plurality of MAC CE messages to the UE 102 when reporting the CSI. The plurality of MAC CE messages can correspond to one or more beams. In such a case, the plurality of MAC CE messages can be interconnected based on the information included in the CSI reports. For example, both the MAC CE messages 502 and 504 include the L1-RSRP levels. The L1-RSRP level included in the MAC CE message 502 is an absolute L1-RSRP, which indicates an absolute strength value of a first beam and occupies 7 bits, as described above in FIG. 1. Whereas the L1-RSRP level included in the MAC CE message 504 is a differential L1-RSRP level, which indicates a relative strength value of a second beam compared with the absolute strength value of the first beam and occupies 4 bits, as described above in FIG. 1. Because the differential L1-RSRP level of the second beam depends on the absolute L1-RSRP level of the first beam, the MAC CE messages 502 and 504 are interconnected and the MAC CE message 504 follows the MAC CE message 502. The connection between the MAC CE messages 502 and 504 can be indicated by the parameter C of the MAC CE message 502. For example, the UE 102 can determine that information included in the CSI report of a following MAC CE message, such as the MAC CE message 504, depends on a prior MAC CE message, such as the MAC CE message 502, if a parameter C of the prior MAC CE message is set to 1. In other aspects, the MAC CE messages are interconnected based on their transmitting times. For example, the MAC CE message 502 can include a CSI report and indicate the MAC CE message 504 by its parameter C if the MAC CE message 504 is transmitted within a predetermined time duration after the MAC CE message 502 is transmitted. In such a case, when the UE 102 receives the MAC CE message 502 with the parameter being 1, the UE 102 expects the MAC CE message 504, which is received within a predetermined time duration, to also include a CSI report.

In some aspects, bits that are not occupied by a parameter C and a CSI report in a MAC CE message are reserved bits. For example, the MAC CE message 502 includes sixteen bits in total. One bit is occupied by the parameter C and thirteen bits are occupied by the CSI report, which includes the CRI and the L1-RSRP level. Therefore, two bits are reserved bits, which are labeled as "R," as shown in FIG. 5.

Figure 6:
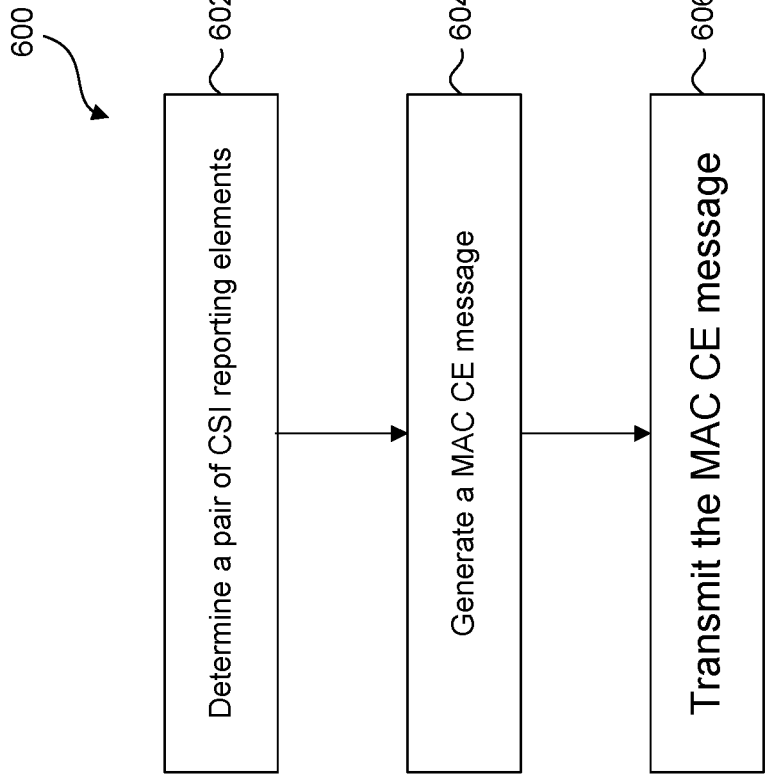
FIG. 6 illustrates an example method of the CSI reporting enhancement with a MAC CE message for NR side-links, according to aspects of the disclosure.

FIG. 6 illustrates an example method 600 of the CSI reporting enhancement with a MAC CE message for NR side-links. The example method 600 is provided for the purpose of illustration only and does not limit the disclosed aspects.

At 602, a UE, such as the UE 106 determines a pair of CSI reporting elements. In some aspects, the pair of CSI reporting elements are selected from a set of CSI reporting elements. For example, the set of CSI reporting elements can include different types of information, such as a CRI, an SSBRI, an L1-RSRP, an L1-SINR, a PMI, an LI, and a coherent transmission indicator as described above in FIG. 1 and FIG. 3. The pair of CSI reporting elements can be a combination of a beam index and a beam quality value, such as a combination of a CRI and an L1-RSRP. In some aspects, the UE 106 can also determine one or more CSI reporting elements instead of the pair of CSI reporting elements.

At 604, the UE 106 generates a MAC CE message that includes the pair of CSI reporting elements or the one or more CSI reporting elements determined in 602. The UE 106 can generate the MAC CE message as described in FIG. 5. For example, the MAC CE message can include a parameter C to indicate a following MAC CE message, the pair of CSI reporting elements, and one or more reserved bits.

At 606, the UE 106 transmits the MAC CE message to another UE, such as the UE 102. In some aspects, the UE 106 transmits the MAC CE message in the MAC layer of the PSSCH of the side-link 112 as described in FIGS. 1 and 306 of FIG. 3.

Figure 7:
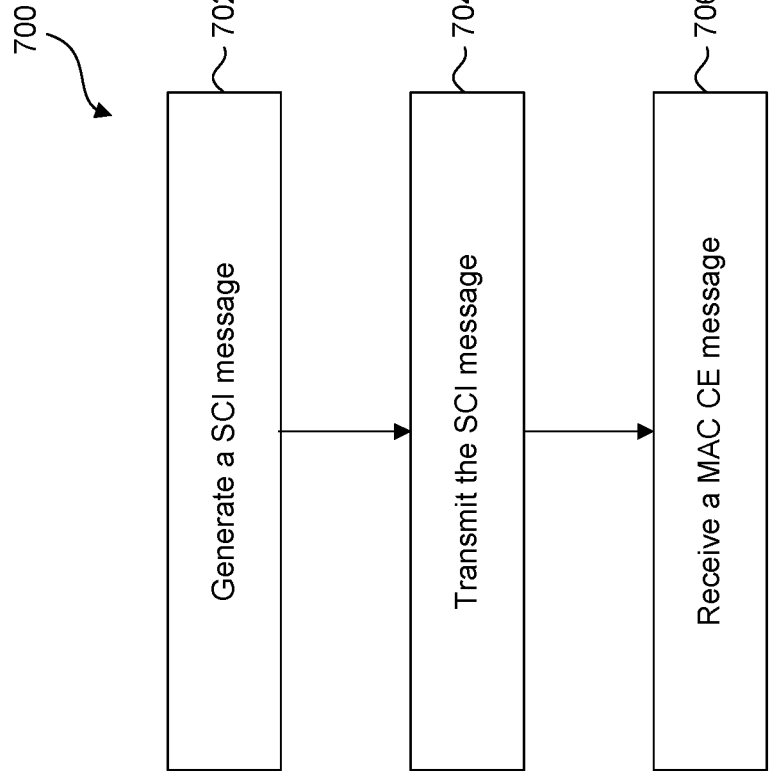
FIG. 7 illustrates an example method of the CSI reporting enhancement with an SCI message for NR side-links, according to aspects of the disclosure.

FIG. 7 illustrates an example method 700 of the CSI reporting enhancement with an SCI message for NR side-links. The example method 700 is provided for the purpose of illustration only and does not limit the disclosed aspects.

At 702, a UE, such as the UE 102 generates the SCI message. In some aspects, the SCI message can be a triggering message that triggers the UE 106 to transmit a CSI reporting, as described in 414 of FIG. 4. The SCI message can also be an activation message or a deactivation message, as described in 412 of FIG. 4.

At 704, the UE 102 transmits the SCI message to another UE, such as the UE 106.

At 706, the UE 102 can receive a MAC CE message. The MAC CE message can be sent by the UE 106 and triggered by the SCI message as described in 414 of FIG. 4. The MAC CE message can also be activated by the SCI message as described in 412 of FIG. 4. The MAC CE message may be formatted as the MAC CE messages 502 or 504 in FIG. 5. In some aspects, the UE 102 may not receive the MAC CE message before the UE 106 receives an additional triggering message if the SCI message is a deactivation message as described in 412 and 414 of FIG. 4.

In some aspects, the UE 102 can receive a CSI report in a different channel or in a different layer, instead of or in addition to receiving the MAC CE message. For example, the UE 102 can receive the CSI report in the physical layer of the PSSCH as described in 306 of FIG. 3 in addition to receiving the MAC CE message in the MAC layer of the PSSCH.

Figure 8:
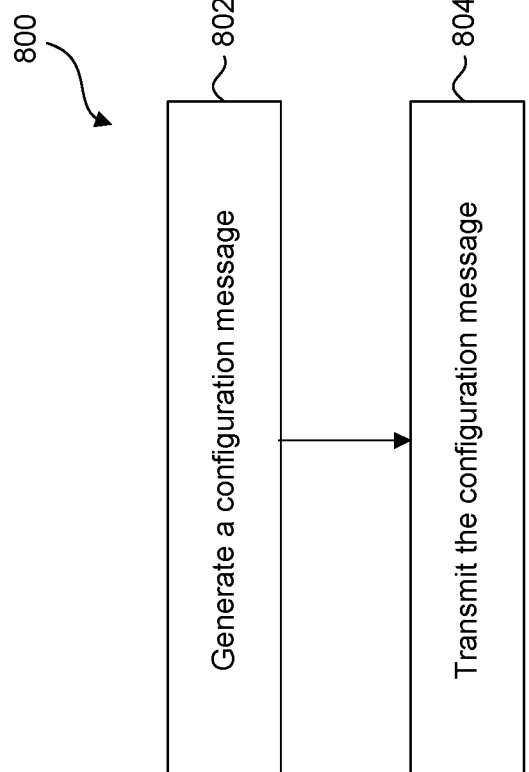
FIG. 8 illustrates an example method of the CSI reporting enhancement with a configuration message for NR side-links, according to aspects of the disclosure.

FIG. 8 illustrates an example method 800 of the CSI reporting enhancement with a configuration message for NR side-links. The example method 800 is provided for the purpose of illustration only and does not limit the disclosed aspects.

At 802, a base station, such as the base station 104 generates the configuration message. The configuration message can configure a CSI report to be transmitted and received in different layers and in different channels, as described in 306 of FIG. 3. For example, the configuration message can configure the UE 106 to transmit the CSI report in the physical layer of the PSSCH. The configuration can similarly configure the UE 102 to receive the CSI report in the physical layer of the PSSCH. The configuration message can also configure the UE 106 to transmit the CSI report in the MAC layer of the PSSCH. In such a case, the configuration message can cause the UE 106 to generate the MAC-CE message as described in FIG. 5. For example, the MAC CE message can be the MAC CE message 502 that comprises a CSI report and an indicator, such as the parameter C, which indicates the MAC-CE message 504, as described in FIG. 5. The CSI report comprises one or more CSI reporting elements out of a set of CSI reporting elements. The MAC CE message can also include one or more reserved bits.

In some aspects, the configuration message can also configure the CSI report to be transmitted based on different scheduling schemes as described in FIG. 4. Finally, the configuration message can configure a format of a MAC CE message as described in FIG. 5.

At 804, the base station 104 transmits the configuration message the UE 102 via the communication link 108. The base station 104 can also transmit the configuration message to the UE 106 directly via the communication link 110 or indirectly via the UE 102.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Figure 9:
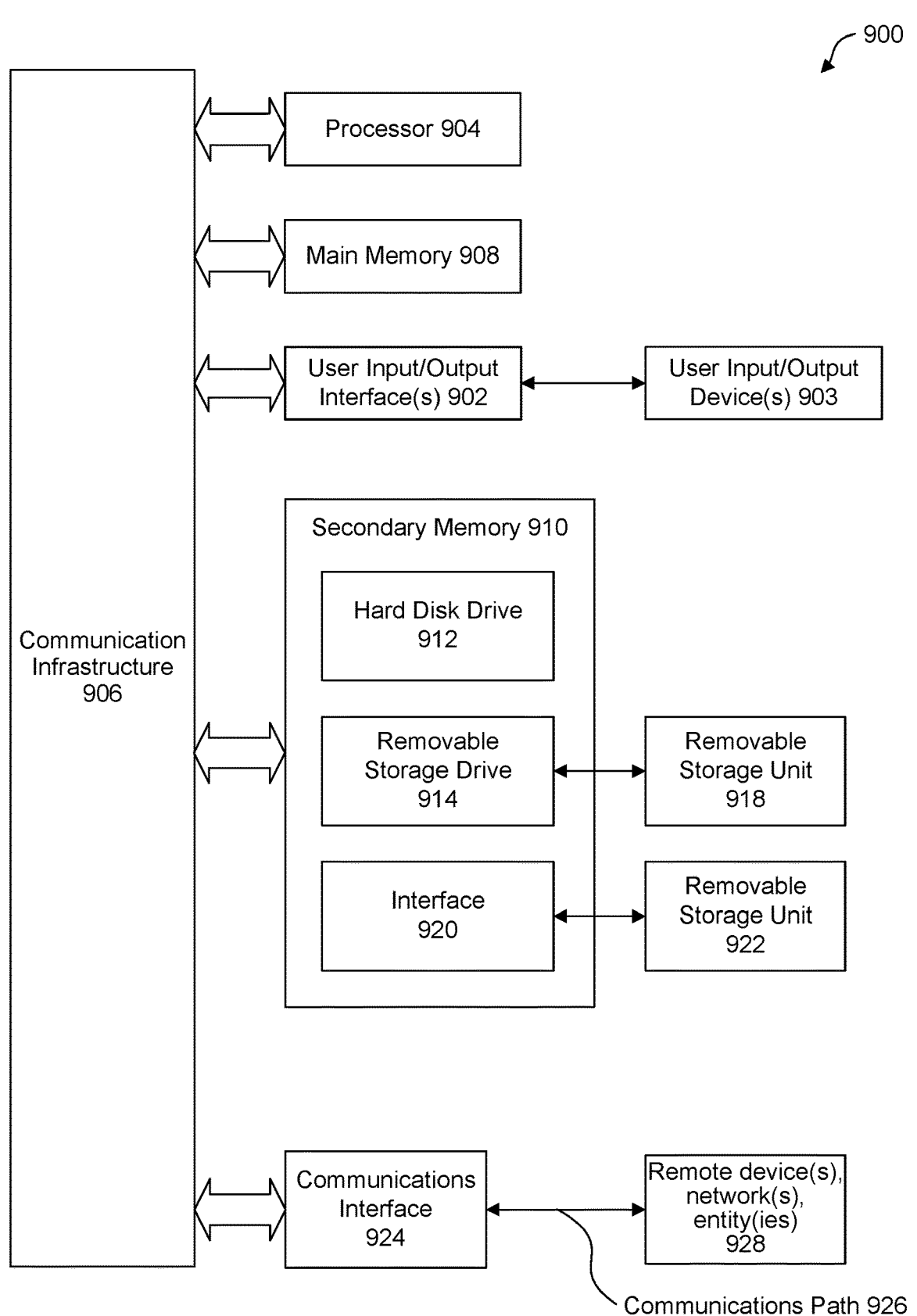
FIG. 9 is an example computer system for implementing some aspects of the disclosure or portion(s) thereof.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:
a transceiver configured to enable wireless communications with a base station and a second UE; and a processor, communicatively coupled to the transceiver, and configured to:
determine one or more channel state information (CSI) reporting elements out of a set of CSI reporting elements;
generate a MAC control element (MAC-CE) message, wherein the MAC-CE message comprises an indicator that indicates a second MAC-CE message to be transmitted within a predetermined time duration after the MAC-CE message is transmitted and a CSI report, and wherein the CSI report comprises the one or more CSI reporting elements; and
transmit, using the transceiver, the MAC-CE message to the second UE via a side-link connection.

2. The UE of claim 1, wherein the set of CSI reporting elements comprises a channel state information reference signal indicator (CRI), a synchronization signal block resource index (SSBRI), layer 1 reference signal received power (L1-RSRP), layer 1 signal to interference and noise ratio (L1-SINR), a precoder matrix indicator (PMI), a layer indicator (LI), and a coherent transmission indicator, and
wherein the processor is further configured to:
transmit, using the transceiver, the coherent transmission indicator to the base station using a radio resource control (RRC) message via a physical uplink shared channel (PUSCH); or
transmit, using the transceiver, the coherent transmission indicator to the second UE using a second RRC message via a physical side-link shared channel (PSSCH).

3. The UE of claim 1, wherein the processor is further configured to:
generate a second CSI report that comprises additional one or more reporting elements of the set of CSI reporting elements; and
transmit, using the transceiver, the second CSI report to the second UE via a physical side-link shared channel (PSSCH) of the side-link connection.

4. The UE of claim 1, wherein the processor is further configured to:
generate a second CSI report that comprises additional one or more reporting elements of the set of CSI reporting elements;
determine that a physical side-link feedback channel (PSFCH) of the side-link connection supports more than 2 bits; and
in response to the determining, transmit, using the transceiver, the second CSI report to the second UE via the PSFCH of the side-link connection.

5. The UE of claim 1, wherein to transmit the MAC-CE message, the processor is further configured to:
receive a side-link control information (SCI) message from the second UE or a downlink control information (DCI) message from the base station.

6. The UE of claim 5,
wherein the SCI message includes a CSI request field,
wherein the CSI request field includes one or more bits, and
wherein the processor is further configured to:
decode the CSI request field of the SCI message to determine the one or more bits; and
transmit, using the transceiver, the CSI report to the second UE based on the one or more bits.

7. The UE of claim 1, wherein the processor is further configured to:
generate a plurality of CSI reports periodically;
transmit, using the transceiver, the plurality of CSI reports to the second UE via the side-link connection periodically; and
receive, using the transceiver, a configuration message from the base station via a higher layer signaling, wherein the configuration message includes a periodicity of the plurality of CSI reports.

8. The UE of claim 1, wherein the processor is further configured to:
receive, using the transceiver, a configuration message from the base station via a higher layer signaling, wherein the configuration message indicates a semi-persistent CSI (SP-CSI) reporting;
receive, using the transceiver, an activation MAC-CE message;
generate a second CSI report based on the activation MAC-CE message, wherein the second CSI report comprises additional one or more reporting elements of the set of CSI reporting elements; and
transmit, using the transceiver, the second CSI report to the second UE via a physical side-link shared channel (PSSCH) or a physical side-link feedback channel (PSFCH) of the side-link connection.

9. The UE of claim 1, wherein the processor is further configured to:
receive, using the transceiver, a configuration message from the base station via a higher layer signaling, wherein the configuration message indicates a semi-persistent CSI (SP-CSI) reporting;
receive, using the transceiver, a side-link control information (SCI) message from the second UE;

generate a second CSI report based on the CSI message, wherein the second CSI report comprises additional one or more reporting elements of the set of CSI reporting elements; and transmit, using the transceiver, the second CSI report to the second UE via a physical side-link shared channel (PSSCH) or a physical side-link feedback channel (PSFCH) of the side-link connection.

10. The UE of claim 1,
wherein the MAC-CE message indicates a layer 1 reference signal received power (L1-RSRP) level using a first number of bits,
wherein the second MAC-CE message indicates a differential L1-RSRP level relative to the L1-RSRP level using a second number of bits, and
wherein the first number is greater than the second number.

11. A user equipment (UE) comprising:
a transceiver configured to enable wireless communications with a base station and a second UE; and
a processor, communicatively coupled to the transceiver, and configured to:
    generate a side-link control information (SCI) message, wherein the SCI message is configured to trigger the second UE to generate a MAC control element (MAC-CE) message, wherein the MAC-CE message comprises an indicator that indicates a second MAC-CE message to be transmitted within a predetermined time duration after the MAC-CE message is transmitted and a channel state information (CSI) report, and wherein the CSI report comprises one or more CSI reporting elements out of a set of CSI reporting elements;
    transmit, using the transceiver, the SCI message to the second UE via a side-link connection; and
    receive, using the transceiver, the MAC-CE message from the second UE via the side-link connection.

12. The UE of claim 11,
wherein the set of CSI reporting elements comprises a channel state information reference signal indicator (CRI), a synchronization signal block resource index (SSBRI), layer 1 reference signal received power (L1-RSRP), layer 1 signal to interference and noise ratio (L1-SINR), a precoder matrix indicator (PMI), a layer indicator (LI), and a coherent transmission indicator, and
wherein the processor is further configured to receive the coherent transmission indicator included in a radio resource control (RRC) message from the second UE via a physical side-link shared channel (PSSCH).

13. The UE of claim 10, wherein the SCI message is further configured to trigger the second UE to:
    generate a second CSI report that comprises one or more reporting elements of the set of CSI reporting elements; and
    transmit the second CSI report to the UE via a physical side-link shared channel (PSSCH) of the side-link connection.

14. The UE of claim 11, wherein the SCI message is further configured to trigger the second UE to:
    generate a second CSI report that comprises one or more reporting elements of the set of CSI reporting elements;

determine that a physical side-link feedback channel (PSFCH) of the side-link connection supports more than 2 bits; and
    in response to the determining, transmit the second CSI report to the UE via the PSFCH of the side-link connection.

15. The UE of claim 11,
wherein the SCI message includes a CSI request field,
wherein the CSI request field includes one or more bits, and
wherein the SCI message is configured to trigger the second UE to decode the CSI request field of the SCI message to determine the one or more bits and transmit the CSI report to the UE based on the one or more bits.

16. The UE of claim 11, wherein the processor is further configured to:
    receive, using the transceiver, a plurality of CSI reports from the second UE via the side-link connection periodically; and
    receive, using the transceiver, a configuration message from the base station via a higher layer signaling, wherein the configuration message includes a periodicity of the plurality of CSI reports.

17. A base station comprising:
a transceiver configured to enable wireless communication with a user equipment (UE); and
a processor, communicatively coupled to the transceiver, and configured to:
    generate a configuration message configured to cause the UE to generate a MAC control element (MAC-CE) message, wherein the MAC-CE message comprises an indicator that indicates a second MAC-CE message to be transmitted within a predetermined time duration after the MAC-CE message is transmitted and a channel state information (CSI) report, and wherein the CSI report comprises one or more CSI reporting elements out of a set of CSI reporting elements; and
    transmit, using the transceiver, the configuration message to the UE via a higher layer signaling.

18. The base station of claim 17,
wherein the set of CSI reporting elements comprises a channel state information reference signal indicator (CRI), a synchronization signal block resource index (SSBRI), layer 1 reference signal received power (L1-RSRP), layer 1 signal to interference and noise ratio (L1-SINR), a precoder matrix indicator (PMI), a layer indicator (LI), and a coherent transmission indicator, and
wherein the processor is further configured to receive the coherent transmission indicator included in a radio resource control (RRC) message via a physical uplink shared channel (PUSCH).

19. The base station of claim 17, wherein the configuration message is further configured to cause the UE to:
    generate a plurality of CSI reports periodically; and
    transmit the plurality of CSI reports to a second UE via a side-link connection periodically.

20. The base station of claim 17, wherein the configuration message is further configured to cause the UE to:
    transmit a plurality of CSI reports to a second UE via a side-link connection semi-persistently.

* * * * *